United States Patent
Li et al.

(10) Patent No.: US 10,003,991 B2
(45) Date of Patent: Jun. 19, 2018

(54) METHOD, DEVICE, SYSTEM AND STORAGE MEDIUM FOR REDUCING MEASUREMENT SIGNALLING IN LTE NETWORK

(71) Applicant: ZTE Corporation, Shenzhen (CN)

(72) Inventors: Bo Li, Shenzhen (CN); Zhaoyu Liu, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 0 days. days.

(21) Appl. No.: 15/037,281

(22) PCT Filed: Aug. 13, 2014

(86) PCT No.: PCT/CN2014/084260
§ 371 (c)(1),
(2) Date: May 17, 2016

(87) PCT Pub. No.: WO2015/070650
PCT Pub. Date: May 21, 2015

(65) Prior Publication Data
US 2016/0286424 A1 Sep. 29, 2016

(30) Foreign Application Priority Data
Nov. 18, 2013 (CN) .......................... 2013 1 0581308

(51) Int. Cl.
*H04W 24/10* (2009.01)
*H04W 48/16* (2009.01)
(Continued)

(52) U.S. Cl.
CPC ....... *H04W 24/10* (2013.01); *H04W 36/0061* (2013.01); *H04W 36/0083* (2013.01); *H04W 48/16* (2013.01); *H04W 76/046* (2013.01)

(58) Field of Classification Search
None
See application file for complete search history.

(56) References Cited

U.S. PATENT DOCUMENTS 9,301,208 B1 * 3/2016 Sitaram ............ H04W 36/0061
2011/0070897 A1   3/2011 Tang
(Continued)

FOREIGN PATENT DOCUMENTS

CN   1984459 A   6/2007
CN   101217753 A   7/2008
(Continued)

OTHER PUBLICATIONS

Qualcomm Europe, T-Mobile, Inter-RAT/frequency Automatic Neighbour Relation Function, and 3GPP TSG-RAN WG3. Meeting #58 R Nov. 9, 072117-2007 [3–], the section 1-section 4 (Document showing a well-known technique).
(Continued)

*Primary Examiner* — Kibrom T Hailu
(74) *Attorney, Agent, or Firm* — Oppedahl Patent Law Firm LLC

(57) ABSTRACT

A method, eNB, UE and system for reducing measurement signalling in a LTE network at an eNB side are provided, including: a reported measurement result containing a physical cell identifier of a neighboring cell is received; the physical cell identifier of the neighboring cell is mapped; and the physical cell identifier of the neighboring cell is sent when determined to be unsuccessfully mapped. Another method for reducing measurement signalling in an LTE network at a UE side is also provided, including: signal strengths of a serving cell and a neighboring cell are measured, and a measurement result is reported; and when the measurement is performed again after an unsuccessfully-mapped physical cell identifier of the neighboring cell is received, a physical cell of the neighboring cell correspond-
(Continued)

ing to the unsuccessfully-mapped physical cell identifier of the neighboring cell is not measured.

15 Claims, 3 Drawing Sheets

(51) Int. Cl.
*H04W 36/00* (2009.01)
*H04W 76/04* (2009.01)

(56) References Cited

U.S. PATENT DOCUMENTS

| | | | |
|---|---|---|---|
| 2012/0164979 A1* | 6/2012 | Bachmann | H04L 63/164 455/411 |
| 2013/0028126 A1* | 1/2013 | Kazmi | H04W 36/0088 370/252 |
| 2014/0010207 A1* | 1/2014 | Horn | H04W 36/165 370/332 |
| 2014/0087715 A1* | 3/2014 | Suzuki | H04W 24/10 455/422.1 |

FOREIGN PATENT DOCUMENTS

| | | |
|---|---|---|
| CN | 101742579 A | 6/2010 |
| CN | 103067867 A | 4/2013 |
| JP | 2013021450 A | 1/2013 |
| JP | 2013192095 A | 9/2013 |
| WO | 2011004599 A1 | 1/2011 |

OTHER PUBLICATIONS

International Search Report in international application No. PCT/CN2014/084260, dated Nov. 19, 2014.
English Translation of the Written Opinion of the International Search Authority in international application No. PCT/CN2014/084260, dated Nov. 19, 2014.
Supplementary European Search Report in European application No. 14861907.5, dated Oct. 20, 2016.
Network Controlled CELL_FACH mobility Feb. 2012.
Support of Inbound Handover for Legacy Mobile May, 2009.
Clarification to ANR Operation Nov. 2010.

* cited by examiner

METHOD, DEVICE, SYSTEM AND STORAGE MEDIUM FOR REDUCING MEASUREMENT SIGNALLING IN LTE NETWORK

TECHNICAL FIELD

The present disclosure relates to a signalling measurement processing technology in the field of mobile communications, and in particular to a method, device, system and a storage medium for reducing measurement signalling in a Long Term Evolution (LTE) network.

BACKGROUND

In an LTE network, a common mobility management policy of an evolved Node B (eNB) is to make a switching judgement on a User Equipment (UE) with reference to a signal difference between a serving cell and a neighbour of the serving cell. Here, the serving cell refers to a cell currently accessed by the UE.

Usually, a coverage area where signals are overlapped with those of other LTE cells exists at the edge of an LTE cell. When a UE moves from the centre of a serving cell to the edge of the serving cell, a signal of the serving cell will be decreased gradually, and a signal of the neighbour of the serving cell will be increased gradually. When the signals of the serving cell and the neighbouring cell satisfy preset threshold values, the eNB can switch the UE to the neighbouring cell, and the neighbour of the original serving cell, as a new serving cell of the UE, serves the UE.

Generally, before the eNB makes a judgement to switch the serving cell, the signal situations of the serving cell of the UE and the neighbour thereof may be acquired through a connected-state measurement mechanism, and the eNB can control and process measurement behaviours of a connected UE, such as additions, deletions or modifications of measurement configurations of the UE. Specifically, the eNB configures the UE through a Radio Resource Control protocol (RRC) Connection Reconfiguration message of a Uu interface to measure the serving cell or the neighbour and report the measurement; the UE measures the serving cell or the neighbour according to the measurement configurations of the eNB, and after satisfying conditions for trigger the measurement configurations, the UE reports a measurement result to the eNB through a Measurement Report of the Uu interface; and the eNB makes a policy decision, to switch the UE to other cells for instance, according to a measurement result reported by the UE, wherein the Uu interface is an air interface between the UE and an Evolved UMTS Terrestrial Radio Access Network (E-UTRAN).

In the LTE network, in order to indicate relative signal changes of the serving cell and the neighbouring cell, the eNB may configure the UE with a measurement event matching the UE, such as an A3 measurement event: Mn+Ofn+Ocn−Hys>Ms+Ofs+Ocs+Oft, where Mn is a signal measurement result of the neighbouring cell, Ofn is a frequency offset of a frequent point of the neighbouring cell, Ocn is an individual offset of the neighbouring cell, Hys is a hysteresis parameter, Ms is a signal measurement result of the serving cell, Ofs is a frequency offset of the serving cell, Ocs is an individual offset of the serving cell, and Oft is an event threshold. The UE detects the measurement results of the serving cell and the neighbouring cell to evaluate whether the measurement results satisfy the conditions of the event, and if so, measurement reporting is triggered. During the evaluation of the measurement event, the UE uses a cell (a listed cell) indicated in a neighbouring-cell list of a measured carrier frequency object and a cell (a detected cell) which is not indicated in the neighbouring-cell list of measured carrier frequency object to evaluate the event. As long as the listed cell or the detected cell satisfies the conditions for triggering the measurement event, the UE sends a measurement result to the eNB through a Measurement Report, the Measurement Report containing a signal measurement result of the serving cell, a physical cell identifier of a neighbouring cell and a signal measurement result of the neighbouring cell.

For measurement event with a handover purpose, the eNB cannot accurately locate a target cell of handover in accordance with the physical cell identifier of the neighbouring cell in a measurement report only, and it is necessary for the eNB to determine the target cell of the handover by mapping the physical cell identifier of the neighbouring cell into an Evolved Cell Global Identifier (ECGI) containing a mobile country code, a mobile network code and a cell identifier. If the UE sends all detected cells to the eNB through a Measurement Report, then when the eNB determines to switch to the target cell, mapping the physical cell identifier of the neighbouring cell into an ECGI may fail. For example, a physical cell mapping rule is not determined, that is a neighbouring relation is not configured, which may cause failure in measurement processing.

In the traditional art, on one hand, it is complicated, effort-consuming and fallible to configure an LTE system with a mapping rule, namely an inter-cell neighbouring relation, and the situation that neighbouring cells are missed to be configuration may frequently occur; and on the other hand, a network environment of an actual commercial scene is complicated, it is probable for a cell to adjust the signal coverage, and the difficulty in configuration of a neighbouring relation is improved. Thus, failure in measurement for handover is common in a network, which causes a great amount of invalid measurement signalling interaction through air interfaces in the network.

Currently, the problem can be solved using a technology for configuration of a automatic neighbouring relation. However, it is necessary for the UE and the eNB to support a technology related to the automatic neighbouring relation, and the configuration technology of the current neighbouring relation is not forcibly required in standard and is optional. Thus, it cannot be guaranteed that all UEs and all eNBs support the automatic neighbouring relation. Even if the UE supports the technology related to the automatic neighbour, in view of a process that the UE performs relevant measurement according to the automatic neighbour relation technology, other service functions of a terminal will be influenced inevitably. Consequently, network operators may start an automatic neighbouring relation function in a specific period and a specific area according to their own requirements.

SUMMARY

In view of this, the embodiments of the present disclosure are mainly intended to provide a method, device, system and a storage medium for reducing measurement signalling in an LTE network, which can be used to reduce measurement reporting triggered by unknown physical cells in a network and save air interface resources.

To this end, the technical solutions of the embodiments of the present disclosure are implemented as follows.

According to an embodiment of the present disclosure, a method for reducing measurement signalling in an LTE network is provided, which may include that:

a reported measurement result containing a physical cell identifier of a neighbouring cell is received, the physical cell identifier of the neighbouring cell is mapped, and the physical cell identifier of the neighbouring cell is sent when the physical cell identifier of the neighbouring cell is determined to be unsuccessfully mapped.

Preferably, the step that the physical cell identifier of the neighbouring cell is mapped may include that:

a physical cell mapping rule is acquired, and the physical cell identifier of the neighbouring cell is mapped into an ECGI according to the physical cell mapping rule, the ECGI being configured to determine a target cell of handover.

Preferably, the step that the physical cell identifier of the neighbouring cell is sent which determined to be unsuccessfully mapped may include that:

the unsuccessfully-mapped physical cell identifier of the neighbouring cell is determined as a physical cell identifier of an unknown neighbouring cell, and the physical cell identifier of the unknown neighbouring cell is recorded in a list of physical cell identifiers of unknown neighbouring cells; the list of physical cell identifiers of unknown neighbouring cells is written into a Black Cells To Add Mod List cell of a measured object; and an RRC Connection Reconfiguration message carrying the cell is sent.

According to an embodiment of the present disclosure, a method for reducing measurement signalling in an LTE network is also provided, which may include that:

signal strengths of a serving cell and a neighbouring cell are measured, and a measurement result is reported; and when the measurement is performed again after an unsuccessfully-mapped physical cell identifier of the neighbouring cell is received, a physical cell of the neighbouring cell corresponding to the unsuccessfully-mapped physical cell identifier of the neighbouring cell is not measured.

Preferably, the step that the measurement result is reported may include that:

the measurement result is reported through a Measurement Report carrying the signal strengths of the serving cell and the neighbouring cell and the physical cell identifier of the neighbouring cell.

According to an embodiment of the present disclosure, a method for reducing measurement signalling in an LTE network is also provided, which may include that:

signal strengths of a serving cell and a neighbouring cell are measured, and a measurement result is reported;

the reported measurement result containing a physical cell identifier of the neighbouring cell is received, the physical cell identifier of the neighbouring cell is mapped, and the physical cell identifier of the neighbouring cell is sent when the physical cell identifier of the neighbouring cell is determined to be unsuccessfully mapped; and when the measurement is performed again after the unsuccessfully-mapped physical cell identifier of the neighbouring cell is received, a physical cell of the neighbouring cell corresponding to the unsuccessfully-mapped physical cell identifier of the neighbouring cell is not measured.

Preferably, the step that the physical cell identifier of the neighbouring cell is mapped may include that:

a physical cell mapping rule is acquired, and the physical cell identifier of the neighbouring cell is mapped into an ECGI according to the physical cell mapping rule, the ECGI being configured to determine a target cell of handover.

Preferably, the step that the physical cell identifier of the neighbouring cell is sent when the physical cell identifier of the neighbouring cell is determined to be unsuccessfully mapped may include that:

the unsuccessfully-mapped physical cell identifier of the neighbouring cell is determined as a physical cell identifier of an unknown neighbouring cell, and the physical cell identifier of the unknown neighbouring cell is recorded in a list of physical cell identifiers of unknown neighbouring cells; the list of physical cell identifiers of unknown neighbouring cells is written into a Black Cells To Add Mod List cell of a measured object; and an RRC Connection Reconfiguration message carrying the cell is sent.

Preferably, the step that the measurement result is reported may include that:

the measurement result is reported through a Measurement Report carrying the signal strengths of the serving cell and the neighbouring cell and the physical cell identifier of the neighbouring cell.

According to an embodiment of the present disclosure, an eNB is provided, which may include: a first receiving unit, a first processing unit and a first sending unit, wherein the first receiving unit may be configured to receive a reported measurement result containing a physical cell identifier of a neighbouring cell;

the first processing unit may be configured to acquire a physical cell mapping rule, map the physical cell identifier of the neighbouring cell according to the physical cell mapping rule, and determine the unsuccessfully-mapped physical cell identifier of the neighbouring cell; and the first sending unit may be configured to send the unsuccessfully-mapped physical cell identifier of the neighbouring cell.

Preferably, the operation that the first processing unit maps the physical cell identifier of the neighbouring cell may include that:

the first processing unit maps the physical cell identifier of the neighbouring cell into an ECGI according to the physical cell mapping rule, the ECGI being configured to determine a target cell of handover.

Preferably, the operation that the first sending unit sends the unsuccessfully-mapped physical cell identifier of the neighbouring cell may include that:

the first sending unit sends the unsuccessfully-mapped physical cell identifier of the neighbouring cell through an RRC Connection Reconfiguration message.

According to an embodiment of the present disclosure, a UE is also provided, which may include: a second sending unit and a second receiving unit, wherein the second sending unit may be configured to measure signal strengths of a serving cell and a neighbouring cell, and report a measurement result;

the second receiving unit may be configured to receive a physical cell identifier of the neighbouring cell which is unsuccessfully mapped; and the second sending unit may be further configured to measure the signal strengths of the serving cell and the neighbouring cell again, report a measurement result again, and not measure a physical cell of the neighbouring cell corresponding to the unsuccessfully-mapped physical cell identifier of the neighbouring cell when the measurement is performed again.

Preferably, the operation that the second sending unit measures the signal strengths of the serving cell and the neighbouring cell again and reports the measurement result again may include that: when the second sending unit measures the signal strengths of the serving cell and the neighbouring cell again, a physical cell of the neighbouring cell corresponding to the unsuccessfully-mapped physical cell identifier of the neighbouring cell received by the second receiving unit is not measured, and the measurement result is reported through a Measurement Report carrying the signal strength of the serving cell, the physical cell identifier of the neighbouring cell and the signal strength of the neighbouring cell.

According to an embodiment of the present disclosure, a system for reducing measurement signalling in an LTE network is also provided, which may include any one eNB and any one UE mentioned above.

According to an embodiment of the present disclosure, a computer storage medium is also provided. Computer executable instructions may be stored in the computer storage medium and may be configured to execute the method for measurement signalling in an LTE network according to an embodiment of the present disclosure.

According to an embodiment of the present disclosure, another computer storage medium is also provided. Computer executable instructions may be stored in the computer storage medium and may be configured to execute another method for measurement signalling in an LTE network according to an embodiment of the present disclosure.

According to an embodiment of the present disclosure, another computer storage medium is also provided. Computer executable instructions may be stored in the computer storage medium and may be configured to execute yet another method for measurement signalling in an LTE network according to an embodiment of the present disclosure.

Through the method, device, system and the storage medium for reducing measurement signalling in an LTE network provided according to the embodiments of the present disclosure, at an LTE eNB side, a reported measurement result containing a physical cell identifier of a neighbouring cell is received, the physical cell identifier of the neighbouring cell is mapped, and the physical cell identifier of the neighbouring cell is sent which determined to be unsuccessfully mapped. At an LTE UE side, the signal strengths of the serving cell and the neighbouring cell are measured, and the measurement result is reported; and when the measurement is performed again after the unsuccessfully-mapped physical cell identifier of the neighbouring cell is received, a physical cell of the neighbouring cell corresponding to the unsuccessfully-mapped physical cell identifier of the neighbouring cell is not measured. Thus, measurement reporting triggered by unknown physical cells in a network can be reduced, and air interface resources are saved. Moreover, it is unnecessary to change a conventional measurement model and protocol to support neighbour measurement, and it is also unnecessary to force a UE and an eNB to support an automatic neighbour relation function.

DETAILED DESCRIPTION

Figure 1:
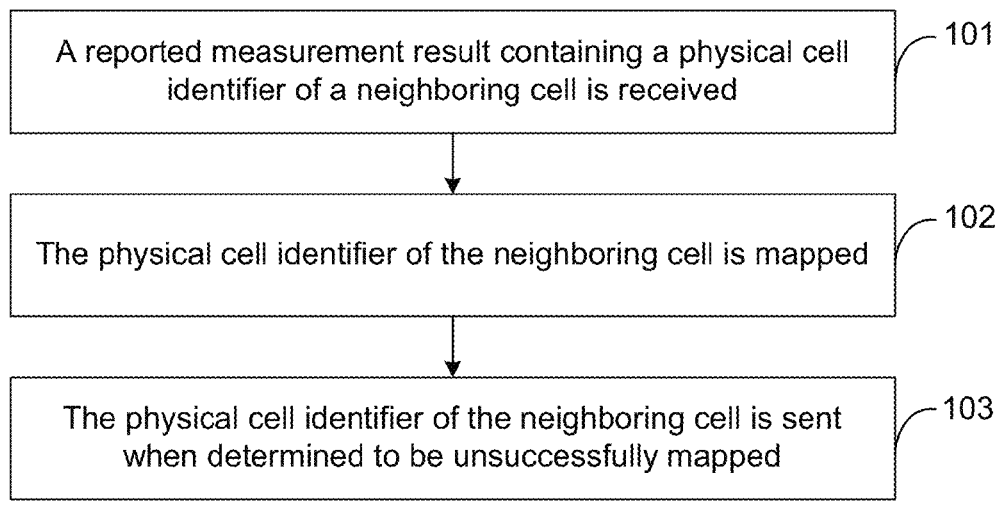
FIG. 1 is a basic implementation flow diagram of a method for reducing measurement signalling in an LTE network at an LTE eNB side according to an embodiment of the present disclosure.

In the embodiments of the present disclosure, at an LTE eNB side, a reported measurement result containing a physical cell identifier of a neighbouring cell is received, the physical cell identifier of the neighbouring cell is mapped, and the neighbour physical cell identifier when determined to be unsuccessfully mapped is sent. At an LTE UE side, signal strengths of a serving cell and a neighbouring cell are measured, and a measurement result is reported; and when the measurement is performed again after the unsuccessfully-mapped physical cell identifier of the neighbouring cell is received, a physical cell of the neighbouring cell corresponding to the unsuccessfully-mapped physical cell identifier of the neighbouring cell is not measured.

Here, an eNB receives a measurement result of signal strength of a cell, the physical cell identifier of the neighbouring cell and a measurement result of signal strength of a neighbouring of the cell through a Measurement Report.

The step that the eNB maps the physical cell identifier of the neighbouring cell contained in the measurement result includes that: the received neighbour physical cell identifier is mapped into an ECGI; when the physical cell identifier of the neighbouring cell is successfully mapped, a processing flow of handover is initiated; when the physical cell identifier of the neighbouring cell is unsuccessfully mapped, the physical cell identifier of the neighbouring cell is determined as a physical cell identifier of an unknown neighbouring cell, and the physical cell identifier of the unknown neighbouring cell is recorded in a list of physical cell identifiers of unknown neighbouring cells; the list of physical cell identifiers of unknown neighbouring cells is written into a cell, i.e., Black Cells To Add Mod List, of a measured object; and an RRC Connection Reconfiguration message, when sent again, carries the Black Cells To Add Mod List cell into which the list of physical cell identifiers of unknown neighbouring cells is written. Here, the unsuccessfully-mapped physical cell identifier of the neighbouring cell is sent by sending the RRC Connection Reconfiguration message carrying the Black Cells To Add Mod List cell into which the list of physical cell identifiers of unknown neighbouring cells is written.

Correspondingly, a UE measures signal strengths of the serving cell and the neighbouring cell according to measurement configurations saved by the UE itself, and reports a measurement result, wherein the measurement result includes the signal strength of the cell, the physical cell identifier of the neighbouring cell and the signal strength of the neighbouring cell.

The UE receives the unsuccessfully-mapped physical cell identifier of the neighbouring cell sent in a form of the RRC Connection Reconfiguration message, and reports a measurement result again through a Measurement Report carrying the signal strength measurement result of the cell, the physical cell identifier of the neighbouring cell and the signal strength measurement result of the neighbouring cell. The carried neighbour physical cell identifier does not include the unsuccessfully-mapped physical cell identifier of the neighbouring cell.

FIG. 1 shows a basic implementation flow of a method for reducing measurement signalling in an LTE network at an eNB side according to an embodiment of the present disclosure. The method includes the steps as follows.

Step 101: A reported measurement result containing a physical cell identifier of a neighbouring cell is received.

Here, an eNB receives a signal strength measurement result of the cell, the physical cell identifier of the neighbouring cell and a signal strength measurement result of the neighbouring cell through a Measurement Report.

Step 102: The physical cell identifier of the neighbouring cell is mapped.

Here, the step that the physical cell identifier of the neighbouring cell in the measurement result is mapped includes that the received neighbour physical cell identifier is mapped to a target cell for handover.

Step 103: The neighbour physical cell identifier, when determined to be unsuccessfully mapped, is sent.

Specifically, when the physical cell identifier of the neighbouring cell is successfully mapped, a switching processing flow is initiated; when the physical cell identifier of the neighbouring cell is unsuccessfully mapped, the physical cell identifier of the neighbouring cell is determined as a physical cell identifier of an unknown neighbouring cell, and the physical cell identifier of the unknown neighbouring cell is recorded in a list of unknown neighbour physical cell identifiers; the list of identifiers of unknown neighbouring physical cells is written into a Black Cells To Add Mod List cell of a measured object; and when an RRC Connection Reconfiguration message is sent again, the Black Cells To Add Mod List cell into which the list of physical cell identifiers of unknown neighbouring cells is written is carried in the RRC Connection Reconfiguration message. Here, the unsuccessfully-mapped physical cell identifier of the neighbouring cell is sent by sending the RRC Connection Reconfiguration message carrying the Black Cells To Add Mod List cell into which the list of physical cell identifiers of unknown neighbouring cells is written.

Figure 2:
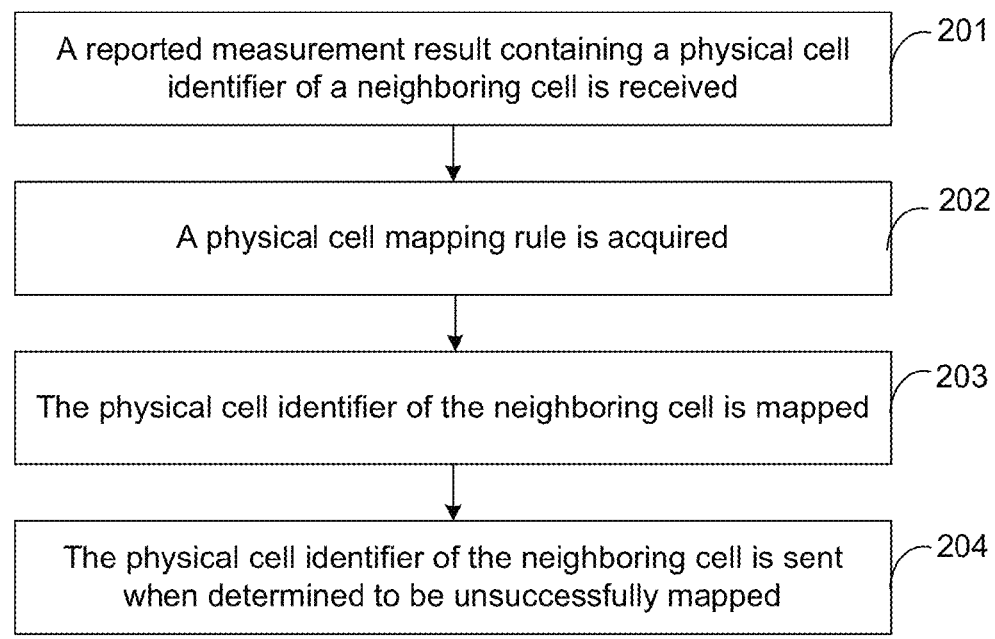
FIG. 2 is a detailed implementation flow diagram of the method for reducing measurement signalling in an LTE network at an LTE eNB side according to an embodiment of the present disclosure.

FIG. 2 shows a detailed implementation flow of a method for reducing measurement signalling in an LTE network at an LTE eNB side according to an embodiment of the present disclosure. The method includes the steps as follows.

Step 201: A reported measurement result containing a physical cell identifier of a neighbouring cell is received.

Here, an eNB receives a signal strength measurement result of the cell, the physical cell identifier of the neighbouring cell and a signal strength measurement result of the neighbouring cell through a Measurement Report.

Step 202: A physical cell mapping rule is acquired.

Here, the eNB acquires a neighbour relation configuration from an Operators and Maintenance Centre (OMC), the neighbour relation configuration referring to the physical cell mapping rule. Specifically, how to acquire the neighbour relation configuration from the OMC by the eNB is the traditional art, and is not repeated here.

Step 203: The physical cell identifier of the neighbouring cell is mapped.

Here, the step that the physical cell identifier of the neighbouring cell in the measurement result is mapped includes that the received physical cell identifier of the neighbouring cell is mapped to a target cell of handover.

Step 204: The physical cell identifier of the neighbouring cell is sent when the physical cell identifier of the neighbouring cell is determined to be unsuccessfully mapped.

Specifically, when the physical cell identifier of the neighbouring cell is successfully mapped, a switching processing flow is initiated; when the physical cell identifier of the neighbouring cell is unsuccessfully mapped, the physical cell identifier of the neighbouring cell is determined as a physical cell identifier of an unknown neighbouring cell, and the physical cell identifier of the unknown neighbouring cell is recorded in a list of physical cell identifiers of unknown neighbouring cells; the list of physical cell identifiers of unknown neighbouring cells is written into a Black Cells To Add Mod List cell of a measured object; and when an RRC Connection Reconfiguration message is sent again, the Black Cells To Add Mod List cell is carried in the RRC Connection Reconfiguration message. Here, the unsuccessfully-mapped physical cell identifier of the neighbouring cell is sent by sending the RRC Connection Reconfiguration message carrying the Black Cells To Add Mod List cell into which the list of physical cell identifiers of unknown neighbouring cells is written.

Figure 3:
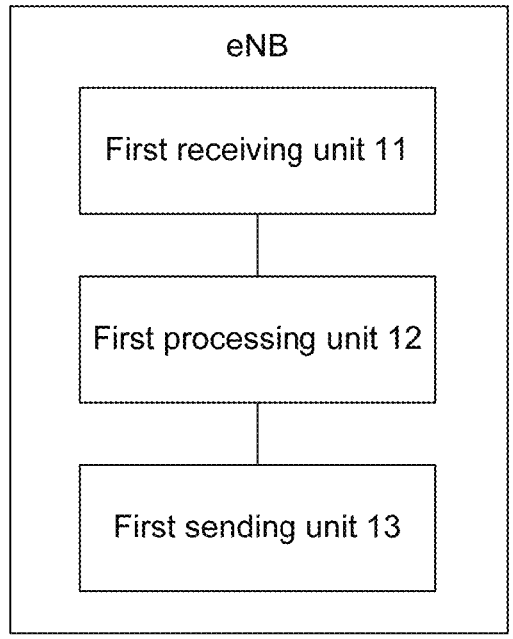
FIG. 3 is a composition structure diagram of an eNB for reducing measurement signalling in an LTE network according to an embodiment of the present disclosure.

In order to realize the method for reducing measurement signalling in an LTE network, an embodiment of the present disclosure also provides an eNB for reducing measurement signalling in an LTE network. FIG. 3 shows a composition structure of the eNB for reducing measurement signalling in an LTE network. The eNB includes: a first receiving unit 11, a first processing unit 12 and a first sending unit 13, wherein the first receiving unit 11 is configured to receive a reported measurement result containing a physical cell identifier of a neighbouring cell;

the first processing unit 12 is configured to acquire a physical cell mapping rule, map the physical cell identifier of the neighbouring cell according to the physical cell mapping rule, and determine an unsuccessfully-mapped neighbour physical cell identifier; and the first sending unit 13 is configured to send the unsuccessfully-mapped physical cell identifier of the neighbouring cell.

Here, in practice, the first receiving unit 11, the first processing unit 12 and the first sending unit 13 may be realized by a Central Processing Unit (CPU), a Micro Processing Unit (MPU), a Digital Signal Processor (DSP) or a Field-Programmable Gate Array (FPGA) located in an eNB. The first receiving unit 11 may also be implemented by a receiver, and the first sending unit 13 may also be realized by a transmitter.

Figure 4:
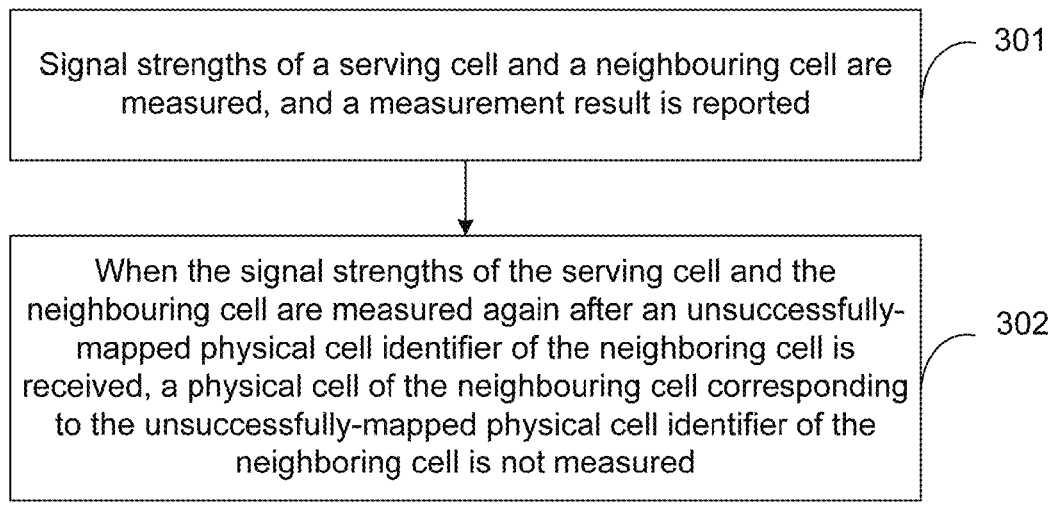
FIG. 4 is an implementation flow diagram of a method for reducing measurement signalling in an LTE network at an LTE UE side according to an embodiment of the present disclosure.

FIG. 4 shows an implementation flow of a method for reducing measurement signalling in an LTE network at a UE side according to an embodiment of the present disclosure. The method includes the steps as follows.

Step 301: Signal strengths of a serving cell and a neighbour cell are measured, and a measurement result is reported.

Specifically, when a UE finds by measurement a neighbouring cell which satisfies the threshold value of a switching measurement configuration event, measurement reporting is triggered, a Measurement Report containing a signal strength measurement result of the serving cell, a physical cell identifier of the neighbouring cell and a signal strength measurement result of the neighbouring cell is sent, and the Measurement Report may be repeatedly sent in an interval period according to measurement configurations.

Step 302: When the signal strengths of the serving cell and the neighbour cell are measured again after the unsuccessfully-mapped physical cell identifier of the neighbouring cell is received, a physical cell of the neighbouring cell corresponding to the unsuccessfully-mapped physical cell identifier of the neighbouring cell is not measured.

Specifically, the unsuccessfully-mapped physical cell identifier of the neighbouring cell received by the UE is an RRC Connection Reconfiguration message carrying a Black Cells To Add Mod List cell into which a list of physical cell identifiers of unknown neighbouring cells is written, the unsuccessfully-mapped physical cell identifier of the neighbouring cell being recorded in the list of unknown neighbour physical cell identifiers.

The UE measures the signal strengths of the serving cell and the neighbour cell again according to its own measurement configurations, and reports the measurement result through the Measurement Report, wherein when the signal strengths of the serving cell and the neighbour cell are measured again, a physical cell of the neighbouring cell corresponding to the unsuccessfully-mapped physical cell identifier of the neighbouring cell received by a second receiving unit is not measured.

Figure 5:
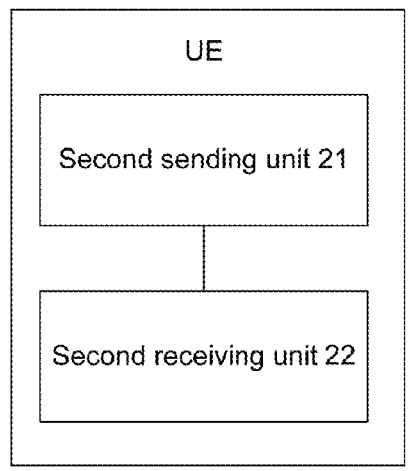
FIG. 5 is a composition structure diagram of a UE for reducing measurement signalling in an LTE network according to an embodiment of the present disclosure.

In order to implement the method for reducing measurement signalling in an LTE network, an embodiment of the present disclosure also provides a UE for reducing measurement signalling in an LTE network. FIG. 5 shows a composition structure of the UE for reducing measurement signalling in an LTE network. The UE includes: a second sending unit 21 and a second receiving unit 22, wherein the second sending unit 21 is configured to measure signal strengths of a serving cell and a neighbour cell of the serving cell, and report a measurement result;

the second receiving unit 22 is configured to receive the neighbour physical cell identifier that is unsuccessfully mapped; and the second sending unit 21 is further configured to measure the signal strengths of the serving cell and the neighbour cell again, and report a measurement result again, the reported measurement result excluding the unsuccessfully-mapped physical cell identifier of the neighbouring cell.

Here, in practice, the second sending unit 21 and the second receiving unit 22 can be implemented by a CPU, an MPU, a DSP or an FPGA located in a UE. The second receiving unit 22 can also be realized by a receiver, and the second sending unit 21 can also be realized by a transmitter.

An embodiment of the present disclosure also provides a system for reducing measurement signalling in an LTE network. The system includes an eNB having a composition structure shown in FIG. 3 and a UE having a composition structure shown in FIG. 5.

Figure 6:
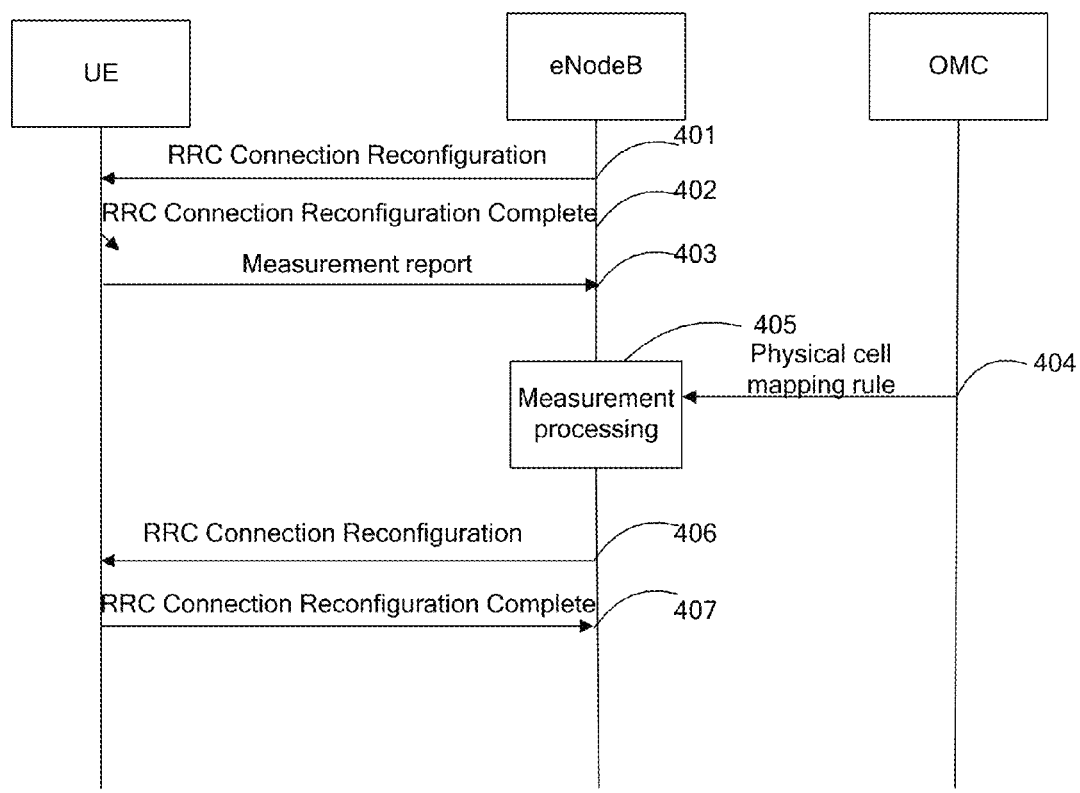
FIG. 6 is a basic implementation flow diagram of a method for reducing measurement signalling in an LTE network according to an embodiment of the present disclosure

In order to implement the system, as shown in FIG. 6, an embodiment of the present disclosure also provides a method for reducing measurement signalling in an LTE network, which includes the steps as follows.

Step 401: An eNB sends an RRC Connection Reconfiguration message to a UE.

Specifically, the RRC Connection Reconfiguration message sent to the UE by the eNB carries a Meas Config cell which is used for configuring the UE with measurement configurations for handover, the measurement configurations for handover including a measured object, a report configuration and a measurement identifier.

Step 402: After receiving the RRC Connection Reconfiguration message, the UE updates the measurement configurations, and returns an RRC Connection Reconnection Reconfiguration Complete message to the eNB.

Step 403: The UE measures a serving cell and a neighbour and reports the measurement according to the updated measurement configurations.

Specifically, when the UE measures the signal strength of the serving cell or the neighbour cell according to the updated measurement configurations and finds by the measurement a cell which satisfies the threshold value of a switching measurement configuration event, measurement reporting is triggered, the measured signal strength of the serving cell, a physical cell identifier of the neighbouring cell and the signal strength of the neighbour cell are sent to the eNB through a Measurement Report, and the Measurement Report can be repeatedly sent in an interval period according to the measurement configurations.

Step 404: The eNB acquires a physical cell mapping rule from an OMC.

Specifically, a neighbour relation configuration refers to the physical cell mapping rule, and how to acquire the neighbour relation configuration from the OMC by the eNB is the traditional art, and is not repeated here.

Step 405: The eNB processes the Measurement Report sent by the UE.

Specifically, the eNB maps the physical cell identifier of the neighbouring cell measured and reported by the UE to a target cell to which the UE is to be switched. If the physical cell identifier of the neighbouring cell is successfully mapped, a switching processing flow is initiated, and this processing flow is ended. If the physical cell identifier of the neighbouring cell is unsuccessfully mapped, Step 406 is executed.

Step 406: The eNB sends to the UE a physical cell identifier of a neighbouring cell corresponding to a measurement result indicating that a target cell cannot be switched to.

Specifically, when the eNB cannot switch the UE to the target cell according to the measurement result reported by the UE, it is indicated that the physical cell identifier of the neighbouring cell is unsuccessfully mapped, the physical cell identifier of the neighbouring cell is determined as a physical cell identifier of an unknown neighbouring cell, and the physical cell identifier of the unknown neighbouring cell is recorded in a list of physical cell identifiers of unknown neighbouring cells; the list of physical cell identifiers of unknown neighbouring cells is written into a Black Cells To Add Mod List cell of a measured object; and when an RRC Connection Reconfiguration message is sent again, the RRC Connection Reconfiguration message carrying the Black Cells To Add Mod List cell into which the list of physical cell identifiers of unknown neighbouring cells is written is sent to the UE.

Step 407: After receiving the RRC Connection Reconfiguration message, the UE updates the measurement configurations again, and when the measurement is performed again, the neighbouring physical cell corresponding to the unsuccessfully-mapped physical cell identifier of the neighbouring cell is not measured.

Specifically, after receiving the RRC Connection Reconfiguration message, the UE updates the Black Cells To Add Mod List cell, and returns an RRC Connection Reconnection Reconfiguration Complete message to the eNB. In a process that the UE performs measurement again, a physical cell identifier in the Black Cells To Add Mod List cell will not be used as an appropriate cell for reporting a measurement event to trigger reporting of the measurement event.

In the embodiments of the present disclosure, if the method for reducing measurement signalling in an LTE network is implemented in a form of a software function module and is sold or used as an independent product, the product can also be stored in a computer readable storage medium. Based on this understanding, the technical solutions of the embodiments of the present disclosure can be substantially embodied in a form of a software product, or parts contributing to the conventional art can be embodied in a form of a software product, and the computer software product is stored in a storage medium, which includes a plurality of instructions enabling a computer device which may be a personal computer, a server or a network device to execute all or part of the method according to each embodiment of the present disclosure. The storage medium includes: various media capable of storing program codes, such as a U disk, a mobile hard disk, a Read Only Memory (ROM), a disk or an optical disc. Thus, the embodiments of the present disclosure are not limited to combination of any specific hardware and software.

Correspondingly, an embodiment of the present disclosure also provides a computer storage medium. Computer executable instructions are stored in the computer storage medium and are configured to execute the method for reducing measurement signalling in an LTE network according to an embodiment of the present disclosure.

An embodiment of the present disclosure also provides another computer storage medium. Computer executable instructions are stored in the computer storage medium and are configured to execute another method for reducing measurement signalling in an LTE network according to an embodiment of the present disclosure.

An embodiment of the present disclosure also provides another computer storage medium. Computer executable instructions are stored in the computer storage medium and are configured to execute another method for reducing measurement signalling in an LTE network according to an embodiment of the present disclosure.

The above are only the preferred embodiments of the present disclosure and are not intended to limit the protection scope of the present disclosure.

What is claimed is:

1. A method for reducing measurement signalling in a Long Term Evolution (LTE) network, comprising:
    receiving, by an evolved Node B (eNB), a reported measurement result containing a physical cell identifier of a neighbouring cell from a User Equipment (UE), mapping, by the eNB, the physical cell identifier of the neighbouring cell, and sending, by the eNB, the physical cell identifier of the neighbouring cell to the UE when the physical cell identifier of the neighbouring cell is determined to be unsuccessfully mapped;
    wherein sending, by the eNB, the physical cell identifier of the neighbouring cell to the UE when the physical cell identifier of the neighbouring cell is determined to be unsuccessfully mapped comprises:
    determining, by the eNB, the unsuccessfully-mapped physical cell identifier of the neighbouring cell as a physical cell identifier of an unknown neighbouring cell, and recording, by the eNB, the physical cell identifier of the unknown neighbouring cell in a list of physical cell identifiers of unknown neighbouring cells;
    writing, by the eNB, the list of physical cell identifiers of unknown neighbouring cells into an Information Element (IE), which is Black Cells To Add Mod List, of a measured object; and
    sending, by the eNB, a Radio Resource Control protocol (RRC) Connection Reconfiguration message carrying the IE to the UE.

2. The method for reducing measurement signalling in an LTE network according to claim 1, wherein mapping, by the eNB, the physical cell identifier of the neighbouring cell comprises:

acquiring, by the eNB, a physical cell mapping rule, and mapping the physical cell identifier of the neighbouring cell into an Evolved Cell Global Identifier (ECGI) according to the physical cell mapping rule, the ECGI being configured to determine a target cell of handover.

3. A method for reducing measurement signalling in a Long Term Evolution (LTE) network, comprising:
    measuring, by a User Equipment (UE), signal strengths of a serving cell and a neighbouring cell, reporting, by the UE, a measurement result, and when the measurement is performed by the UE again after an unsuccessfully-mapped physical cell identifier of the neighbouring cell is received from an evolved Node B (eNB) by the UE, not measuring, by the UE, a physical cell of the neighbouring cell corresponding to the unsuccessfully-mapped physical cell identifier of the neighbouring cell;
    wherein the unsuccessfully-mapped physical cell identifier of the neighbouring cell is received from the eNB by the UE through a Radio Resource Control protocol (RRC) Connection Reconfiguration message carrying an Information Element (IE), which is Black Cells To Add Mod List, of a measured object; wherein the IE comprises a list of physical cell identifiers of unknown neighbouring cells, and the unsuccessfully-mapped physical cell identifier of the neighbouring cell is a physical cell identifier of an unknown neighbouring cell.

4. The method for reducing measurement signalling in an LTE network according to claim 3, wherein reporting, by the UE, the measurement result comprises:
    reporting, by the UE, the measurement result through a Measurement Report carrying the signal strengths of the serving cell and the neighbouring cell as well as the physical cell identifier of the neighbouring cell.

5. A method for reducing measurement signalling in a Long Term Evolution (LTE) network, comprising:
    measuring, by a User Equipment (UE), signal strengths of a serving cell and a neighbouring cell, and reporting, by the UE, a measurement result;
    receiving, by an evolved Node B (eNB), the reported measurement result containing a physical cell identifier of the neighbouring cell, mapping, by the eNB, the physical cell identifier of the neighbouring cell, and sending, by the eNB, the physical cell identifier of the neighbouring cell when the physical cell identifier of the neighbouring cell is determined to be unsuccessfully mapped; and
    when the measurement is performed by the UE again after the unsuccessfully-mapped physical cell identifier of the neighbouring cell is received by the UE, not measuring, by the UE, a physical cell of the neighbouring cell corresponding to the unsuccessfully-mapped physical cell identifier of the neighbouring cell;
    wherein sending, by the eNB, the physical cell identifier of the neighbouring cell when the physical cell identifier of the neighbouring cell is determined to be unsuccessfully mapped comprises:
    determining, by the eNB, the unsuccessfully-mapped physical cell identifier of the neighbouring cell as a physical cell identifier of an unknown neighbouring cell, and recording, by the eNB, the physical cell identifier of the unknown neighbouring cell in a list of physical cell identifiers of unknown neighbouring cells;

writing, by the eNB, the list of physical cell identifiers of unknown neighbouring cells into an Information Element (IE), which is Black Cells To Add Mod List, of a measured object; and sending, by the eNB, a Radio Resource Control protocol (RRC) Connection Reconfiguration message carrying the IE to the UE.

6. The method for reducing measurement signalling in an LTE network according to claim 5, wherein mapping, by the eNB, the physical cell identifier of the neighbouring cell comprises:

acquiring, by the eNB, a physical cell mapping rule, and mapping the physical cell identifier of the neighbouring cell into an Evolved Cell Global Identifier (ECGI) according to the physical cell mapping rule, the ECGI being configured to determine a target cell of handover.

7. The method for reducing measurement signalling in an LTE network according to claim 5, wherein reporting, by the UE, the measurement result comprises:

reporting, by the UE, the measurement result through a Measurement Report carrying the signal strengths of the serving cell and the neighbouring cell and the physical cell identifier of the neighbouring cell.

8. An evolved Node B (eNB), comprising: a first receiving unit, a first processing unit and a first sending unit, wherein the first receiving unit is configured to receive from a User Equipment (UE) a reported measurement result containing a physical cell identifier of a neighbouring cell;

the first processing unit is configured to acquire a physical cell mapping rule, map the physical cell identifier of the neighbouring cell according to the physical cell mapping rule, and determine the physical cell identifier of the neighbouring cell which is unsuccessfully mapped; and the first sending unit is configured to send the unsuccessfully-mapped physical cell identifier of the neighbouring cell to the UE;

the first sending unit is further configured to send the unsuccessfully-mapped physical cell identifier of the neighbouring cell to the UE through a Radio Resource Control protocol (RRC) Connection Reconfiguration message carrying an Information Element (IE), which is Black Cells To Add Mod List, of a measured object; wherein the unsuccessfully-mapped physical cell identifier of the neighbouring cell is determined as a physical cell identifier of an unknown neighbouring cell and a list of physical cell identifiers of unknown neighbouring cells is written into the IE.

9. The eNB according to claim 8, wherein the first processing unit is configured to: map the physical cell identifier of the neighbouring cell into an Evolved Cell Global Identifier (ECGI) according to the physical cell mapping rule, the ECGI being configured to determine a target cell of handover.

10. A User Equipment (UE), comprising: a second sending unit and a second receiving unit, wherein the second sending unit is configured to measure signal strengths of a serving cell and a neighbouring cell, and report a measurement result to an evolved Node B (eNB);

the second receiving unit is configured to receive from the eNB a physical cell identifier of the neighbouring cell which is unsuccessfully mapped; and the second sending unit is further configured to measure the signal strengths of the serving cell and the neighbouring cell again, then report a measurement result to the eNB, and not measure a physical cell of the neighbouring cell corresponding to the unsuccessfully-mapped physical cell identifier of the neighbouring cell when the measurement is performed again;

the second receiving unit is further configured to receive from the eNB the unsuccessfully-mapped physical cell identifier of the neighbouring cell through a Radio Resource Control protocol (RRC) Connection Reconfiguration message carrying an Information Element (IE), which is Black Cells To Add Mod List, of a measured object; wherein the IE comprises a list of physical cell identifiers of unknown neighbouring cells, and the unsuccessfully-mapped physical cell identifier of the neighbouring cell is a physical cell identifier of an unknown neighbouring cell.

11. The UE according to claim 10, wherein the second sending unit is configured to report the measurement result through a Measurement Report carrying the signal strength of the serving cell, the physical cell identifier of the neighbouring cell and the signal strength of the neighbouring cell to the eNB.

12. A system for reducing measurement signalling in a Long Term Evolution (LTE) network, comprising an evolved Node B (eNB) according to claim 8 and a User Equipment (UE) comprising a second sending unit and a second receiving unit, wherein the second sending unit is configured to measure signal strengths of a serving cell and a neighbouring cell, and report a measurement result to the eNB;

the second receiving unit is configured to receive from the eNB a physical cell identifier of the neighbouring cell which is unsuccessfully mapped; and the second sending unit is further configured to measure the signal strengths of the serving cell and the neighbouring cell again, then report a measurement result to the eNB, and not measure a physical cell of the neighbouring cell corresponding to the unsuccessfully-mapped physical cell identifier of the neighbouring cell when the measurement is performed again.

13. A non-transitory computer storage medium, storing computer executable instructions configured to execute a method for reducing measurement signalling in a Long Term Evolution (LTE) network according to claim 1.

14. A non-transitory computer storage medium, storing computer executable instructions configured to execute a method for reducing measurement signalling in a Long Term Evolution (LTE) network according to claim 3.

15. A non-transitory computer storage medium, storing computer executable instructions configured to execute a method for reducing measurement signalling in a Long Term Evolution (LTE) network according to claim 5.

* * * * *